Dec. 1, 1936.  G. R. BOTT  2,062,290

JOURNAL BEARING

Original Filed Sept. 14, 1933

INVENTOR
George R. Bott
BY
his ATTORNEY

Patented Dec. 1, 1936

2,062,290

UNITED STATES PATENT OFFICE 2,062,290

JOURNAL BEARING

George R. Bott, Stamford, Conn., assignor to Norma-Hoffmann Bearings Corporation, Stamford, Conn., a corporation of New York Application September 14, 1933, Serial No. 689,348
Renewed February 11, 1936

10 Claims. (Cl. 308—184)

My present invention relates to journal bearings and more particularly to an improved construction of means whereby to support ball or roller bearing devices in the journal elements.

Some of the objects of the invention are: to provide mountings or bushings which break up the conduction of noise from the anti-friction devices to the journal supports; to provide mountings having adjustably extensible and contractible characteristics whereby to adapt themselves to the journal bores, to be in effect self-aligning and overcome mis-alignment generally, and which are capable of being applied and retained under compression so as to obviate difficulties arising from imperfect fit and thereby eliminate all radial and axial looseness; and further to provide mountings which are effective in eliminating looseness and vibration, in lessening wear, and in obviating the necessity for lubrication.

A further object of the invention is to provide in a journal bearing assemblage a vibration absorbing and sound-deadening medium in the form of a rubber ring novelly shaped to suit an axially tapered journal bore so as to have a tight bearing clamping engagement with the anti-friction device which it supports and with the journal by which it is supported. Still a further object is to provide a rubber ring or bushing of this character having on its periphery for tightly contacting the journal a plurality of latterly yieldable fillet bands of regular shape.

This invention is also concerned with an improved unit assemblage of journal bearing parts, more particularly with the expeditious, economical and efficient assemblage of the ball or roller bearing devices of a shaft, the noise insulating mountings or bushings for such devices, and the journal elements or supports for the entire arrangement.

The device of my invention may be usefully employed, for example, in connection with electrically-operated household appliances, such as vacuum cleaners in which, according to the usual arrangement, the armature shaft is equipped with ball or roller bearing devices mounted in journal elements forming part of the housing for the electric motor.

With the foregoing and other objects in view, the distinguishing features of my invention and the improved elements and arrangement characterizing its practical embodiment, which are illustrated as an example, will be more particularly explained in the specific description following.

Reference will now be had to the accompanying drawing, wherein similar characters of reference are used to indicate corresponding parts in the several views, and in which:—

Figure 1:
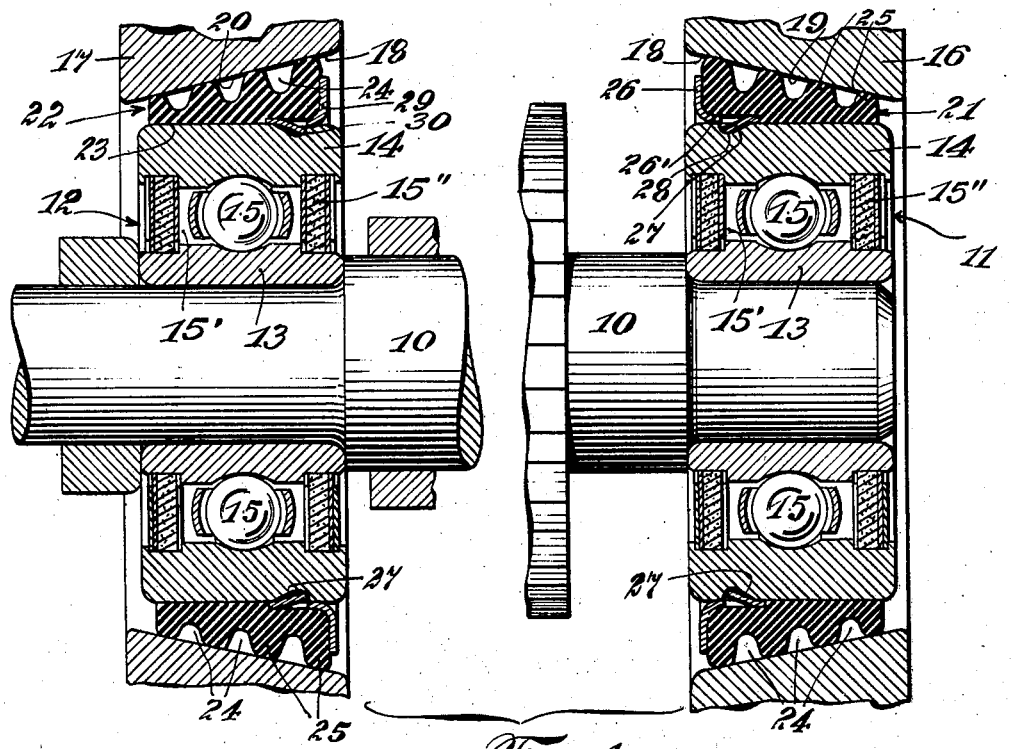
Figure 1 represents a fragmentary vertical sectional view, showing a pair of cooperating journal bearings embodying the improvements of my present invention.

For purposes of illustration, my invention is shown in connection with a shaft 10 which may in practice comprise the armature shaft for an electric motor, or any suitable driving or driven shaft which is to be mounted in journal bearings for silent or nearly silent operation.

Two anti-friction units of like or similar construction, indicated in general by the reference characters 11 and 12, are shown associated with the shaft 10 as means by which to mount the shaft for operation, each of the two anti-friction units as herein shown comprising an inner race ring 13, an outer race ring 14 and ball elements 15 interposed in the usual way between these two race rings. These anti-friction devices may, in practice, be of any known or approved construction, and either of the open or sealed type. In the present instance, in which I have shown the sealed type, the annular grease chamber 15' of each unit, existent between the race rings 13 and 14 thereof, is closed at its opposite ends by annular sealing means 15".

16 and 17 denote journal elements or supports for the shaft bearings and these may consist either of independent supports or of parts of a housing for enclosing an electric motor or the like. According to an important feature of my invention, the journal bore or opening in each of these journal elements is made much larger than the overall diameter of the anti-friction unit which is to be mounted therein so as to provide around the outer race ring of the unit, when it is mounted, a relatively wide annular space 10 and the encircling wall of the journal element defining this space is axially tapered or beveled outwardly with respect to the outer race ring so that the annular space gradually increases in cross dimension from one side of the bearing element to the other side thereof. In carrying out my invention, where two journal elements as 16 and 17 are employed, the tapered or beveled walls 19 and 20 of the respective journal elements are tapered or beveled reversely, as shown in Fig. 1 so that the larger ends of the annular spaces will be in confronting relation at the inner or adjacent sides of the two journal bearing structures while the smaller ends of said spaces will come at the opposite or remote faces thereof.

For mounting the two anti-friction units and hence the shaft which is carried thereby, I provide in each of the annular spaces between the anti-friction unit and its journal element a mounting or bushing in the form of a flexible rubber ring, which may be molded, cast or otherwise economically produced. Thus, in the present example, I show a rubber ring 21 tightly disposed between the outer race ring of the anti-friction unit 11 and the journal element 16 and a similar rubber ring 22 tightly fitted between the outer race ring of the anti-friction unit 12 and its journal element 17.

The shape of the rubber mounting rings or bushings forms a very important part of my invention as previously inferred in the objects of the invention, and since these rubber rings may be similar and serve similar purposes, a particular description of one rubber ring will suffice for both. The rubber ring is produced with a central or axial opening 23 of a diameter normally somewhat less than the outside diameter of the outer ring 14 in order that the rubber ring will have to be expanded somewhat to be applied or slipped upon the outer ring so as to surround the same, the object of this provision being to provide a tight bearing frictional or hugging pressure between the rubber ring and the race ring which it surrounds. The periphery of the rubber ring is transversely tapered in substantial agreement with the taper of the journal bore or opening of the journal elements with which it is to coact and cooperate. Besides this, the outer periphery of the rubber ring is formed with a plurality of alternating grooves 24 and fillet bands 25 all of which may be, and preferably are, normally concentric with the axis of the ring while the outer faces of the fillet bands are tapered in ensemble in substantial agreement with the taper of the journal element wall with which they are to coact and cooperate. When the journal bearing is assembled, the assembly is made so that the flexibility of the rubber ring will be utilized under compression, that is to say, the rubber ring is disposed under compression in the annular space between the outer race ring and the surrounding journal element whereby, in the journal bearing construction, to be maintained under compression for eliminating all radial and axial looseness of the bearing assembly while at the same time assuring in operation a silent or nearly silent working effect since the rubber ring will break and dampen the conduction of noise incident to the very rapid rotation of the shaft, of the inner race ring and as well of the ball elements between the inner race ring and outer race ring. In its diametrical dimension, the rubber ring may be, and preferably is, made slightly larger than the space which is to be filled thereby.

In assembling the rubber ring in the journal bearing construction, the rubber ring is subjected to pressure exerted in an endwise or axial direction to compress and confine the conical ring between the outer race ring and the conical journal bearing wall, and such assembly may be effected either by entering the smaller end of the rubber ring through the larger end of the space or by applying the larger end of the journal opening over the smaller end of the rubber ring. Under either mode of application, the axially tapered journal wall, being tapered complementary to the conical ring, serves as a surrounding abutment against which the ring is forced and thereby compressed so as to make a firm, tight cushion for the anti-friction unit which it contains. An important consideration in this regard is that the rubber ring should be forced so tightly into its seat between the outer race ring and the journal element that there will be no rotation of the rubber ring or creeping thereof, the object being to securely maintain the rubber ring under compression and in its position by such tight frictional contact that while exerting a frictional hugging pressure around the race ring, its fillet bands will have tight bearing clamping engagement against the tapered wall of the journal element. As the ring is forced to its seat, more or less air is expelled from the grooves 24 with the result that the bands 25 will have in effect a vacuum cup gripping or clamping action against the surrounding wall.

In employing my invention in each of two journal bearings as shown in Fig. 1, the anti-friction unit 11 being mounted on the shaft 10 and the rubber ring 21 being in place upon the outer race ring 14, this assembly is applied to the larger end of the journal bore and forced inwardly thereinto until the rubber ring is firmly seated in place by the engagement of the bands against the constantly narrowing journal bearing wall 19. A retainer ring 26 of sheet metal or the like, made with an inwardly curved flange portion 26' having spaced struck-out tongues 27, may be applied against the larger end of the rubber ring so as to enter said flange portion within the hub of the same and snap said tongues into a groove 28 provided for the purpose in the outer race ring. Having thus mounted the insulated journal parts in the journal element 16, the other journal element 17, is applied endwise around the rubber ring 22 until the narrowing journal bearing wall 20 properly encompasses and compresses the rubber ring upon the anti-friction bearing carried thereby, the retainer ring 29 of this unit preferably having been interlocked with the groove 30 before the application of the journal element 17.

Assuming the various parts to occupy the positions shown in Fig. 1, the shaft and its anti-friction bearing units will be firmly yet resiliently cushioned, inasmuch as the reversely tapered journal elements and correspondingly tapered mountings prevent axial displacement in either direction. It will of course be appreciated that if the two journal elements 16 and 17 constitute parts of a housing, such, for instance, as an electric motor housing, one of the journal elements, for instance, the journal element 17 as described herein, must comprise a separate element adapted to be attached to the housing proper.

Figures 2, 3, 4:
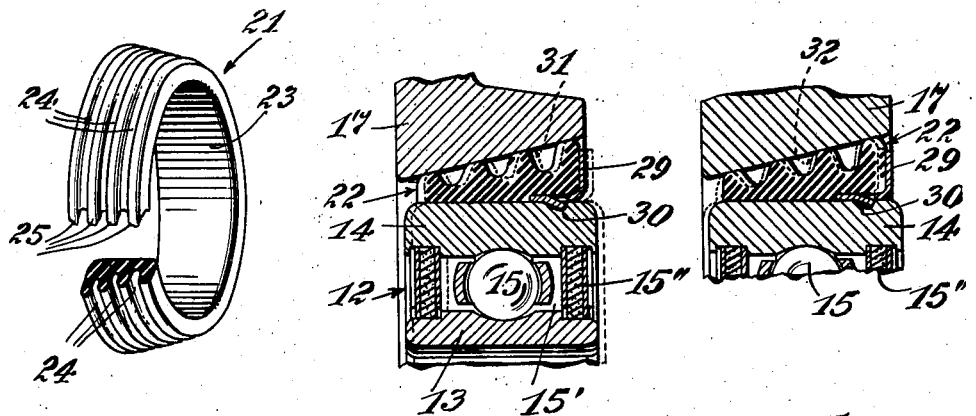
Fig. 2 is a perspective view, showing the rubber mounting ring of my invention, the same being partly broken away to illustrate the alternating fillet bands and grooves.
Figs. 3 and 4 are fragmentary sectional details, illustrating in broken lines the complementary ways in which the peripheral bands of a mounting ring may yield relatively with respect to the body of the ring.

It will be appreciated that in this arrangement, due to the provision of alternating grooves 24 and fillet bands 25, the latter, even when the rubber ring is tightly compressed in its seat, are adapted to yield latterly to a limited extent both in the direction indicated by the broken line 31 in Fig. 3, and in the direction as indicated by the broken line 32 in Fig. 4. It will further be appreciated that if the shaft 10 with its anti-friction units oscillates axially, the fillet bands will compensate for such oscillation, yielding latterly while entirely avoiding any radial and axial looseness and at the same time maintaining accuracy and concentricity.

In the utilization of my rubber mountings or bushings, it will be recognized that no accurate journal bores are necessary and that fine finishing or surfacing of the tapering walls is also unnecessary, since the flexibility of the rubber under compression compensates for small inaccuracies and irregularities. Another advantage is that the conical rubber rings are self-aligning, since under compression they adapt themselves to the bores of the journal elements and overcome mis-alignment. By means of the construction described, the journal bearings may be rapidly assembled with all unevenness or irregularities in surface finishing taken up or compensated for by reason of the flexibility of the rubber. In other words, in a pair of journal bearings, self-adjustments and self-alignments are realized irrespective of irregularities in the journal bores and of any mis-alignment thereof. With my improvements, the anti-friction units may be said to be cushioned in flexible rubber, pressed into their seats so tightly and under compression that substantially all looseness and vibration will be eliminated in addition to providing an effective insulation for breaking and dampening the conduction of noise incident to exceedingly rapid rotation of the shaft and its bearing parts.

It will be noted that the structure shown in Fig. 1, has a shaft with two bearings, the outer surfaces of the race rings being cylindrical, and upon these cylindrical surfaces cylindrical bores of resilient members contact, which resilient members have conically shaped exterior surfaces. These resilient members are placed back to back, that is, the portions of largest diameter are nearest each other and the portions of the smallest diameter are farthest away from each other. They are placed reversely to each other. The journal walls are arranged reversely to each other and reversely to the resilient members, the portions of largest diameter of the journal walls being nearest each other and the portions of smallest diameter being farthest away from each other. The parts shown in Figure 1 are assembled in such manner that both resilient members are placed under compression and the maintenance of such compression takes up the looseness between the parts.

The terms and expressions employed are used as terms of description and not of limitation, and I have no intention, in the use of such terms and expressions, of excluding any mechanical equivalents of the features shown and described, or portions thereof, but recognize that various structural modifications are proper within the scope of the invention claimed

I claim:—

1. A mounting for a shaft supporting ball bearing device including an outer race ring with respect to which the inner race ring and shaft are jointly rotatable, comprising an outer supporting journal element the bearing wall of which is of larger diameter than said outer race ring and axially tapered to provide an intervening space enlarging from one side to the other, a yieldable ring in said space tightly surrounding the outer race ring and having a plurality of integrally connected laterally yieldable fillet bands in tight clamping engagement with said bearing wall, said bands in ensemble outline tapering in substantial agreement with the taper of said wall, and means interengaged with the outer ring contacting and engaging with said yieldable ring at the larger end of said space.

2. A mounting of the type described comprising two cone journal walls reversely coned with respect to one another, a shaft, two anti-friction devices thereon, disposed one within each journal wall with its outer race ring substantially spaced within the encircling portion of the wall, cone resilient rings filling the spaces between the outer race rings and journal walls, means carried by the outer race to compress said resilient rings between the outer race and the journal walls, the peripheries of said rings being reversely coned in agreement with the journal walls, said resilient rings being effective to eliminate any radial and axial looseness in the anti-friction shaft mounting while constituting vibration absorbing mediums.

3. A mounting of the type described comprising two cone journal walls reversely coned with respect to one another, a shaft, two anti-friction devices thereon, disposed one within each journal wall with its outer race ring substantially spaced within the encircling portion of the wall, cone rubber rings filling the spaces between the outer race rings and journal walls, means engaging the outer race to compress said rubber rings between the outer race ring and the journal walls, the peripheries of said rings being reversely coned in agreement with the journal walls, and said rubber rings having on their coned surfaces integrally connected latterly yieldable fillet bands which constitute the tight clamping engagement means against the journal walls.

4. A journal bearing including a tubular body portion the opening of which is defined by an axially tapered wall, an anti-friction bearing unit forming a substantial annular space between it and said wall, a mounting composed entirely of elastic material and comprising a ring established in the annular space under compression, said elastic ring having circumferential spaced apart fillet bands with spaces therebetween, said fillet bands being compressed against said tapered wall of the tubular body and sealing said spaces thereagainst to cushion the ring, and means for holding said yieldable material to the said antifriction bearing unit.

5. A journal bearing including a tubular body portion the opening of which is defined by an axially tapered wall, an anti-friction bearing unit forming a substantial annular space between it and said wall, a mounting composed entirely of elastic material and comprising a ring established in the annular space under compression, said elastic ring having spaced apart circumferential fillet bands providing air cushions therebetween and adapted to be compressed against said wall of the tubular body portion to seal the air cushions against the wall and provide continuous annular supports against the wall for the ring, and means for holding said yieldable material to the said antifriction bearing unit.

6. In an anti-friction bearing including an inner race ring, an outer race ring and anti-friction elements between said rings, a yieldable annulus mounted on the periphery of the outer race ring, said annulus tapering from end to end, and means engaging the periphery of the outer race ring and the larger end of the annulus for holding said annulus on said outer race ring.

7. In an anti-friction bearing including an inner race ring, an outer race ring and anti-friction elements between said rings, a yieldable annulus mounted on the periphery of the outer race ring, said annulus tapering from end to end, a retainer member for holding said annulus on said outer race ring, and coacting means carried by said retainer member and said outer race ring for holding said annulus on said outer race ring against movement in one direction.

8. In an anti-friction bearing including an inner race ring, an outer race ring and anti-friction elements between said rings, a yieldable annulus mounted on the periphery of the outer race ring, said annulus tapering from end to end and having a plurality of spaced annular grooves whereby to provide a plurality of fillet bands of different diameters, a retainer member for holding said annulus on the periphery of the outer race ring, said outer race ring having an annular groove in the periphery thereof, and means carried by said retainer member engaging in said groove for holding said annulus against movement in one direction.

9. In a journal bearing, a shaft, an anti-friction device, the inner race ring of which surrounds the shaft and is secured thereto and movable therewith and the outer race ring of which is freely movable of the shaft, and has vibratory movements independent of those of the inner race ring, a resilient member on the outer peripheral surface of the outer ring having an outer cylindrical contour, and a support for the outer peripheral surface of the resilient member, said support having an inner conical bore, the said resilient member having one wall of cylindrical shape contiguous to the outer peripheral cylindrical surface of the outer member, and the other wall of conical shape contiguous with the inner conical wall of the support, said resilient member taking up all the radially disposed space between the outer peripheral wall of the outer race ring and the inner conical wall of the support and arranged to absorb the radial thrusts of the outer race ring, whereby, upon the free vibratory movement of the outer race ring, reactive forces angular to those created by the free movements of the outer race ring are set up in the conically shaped resilient ring and absorbed thereby.

10. In a mounting of the type described, having two journal walls, a shaft, and two antifriction devices thereon, disposed one within each journal wall with its outer cylindrical race ring substantially spaced within the encircling portion of the wall; said journal walls being reversely coned with respect to one another with their largest diameters proximate to each other, cone resilient members having their interior bores of cylindrical shape and their exterior surfaces of conical shape and being placed on the outer race members in reverse position, with the portions of smallest diameter placed away from each other, said members filling the spaces between the cylindrical outer race rings and the inner conical surfaces of the journal walls for taking up radial thrusts of the outer rings, means holding said resilient members while the same are compressed between the outer races and the journal walls, said members having portions free of said holding means, said resilient rings being effective to eliminate any radial and axial looseness in the antifriction devices while constituting vibration-absorbing mediums.

GEORGE R. BOTT.